United States Patent [19]

Sargent

[11] Patent Number: 5,113,350
[45] Date of Patent: May 12, 1992

[54] COMPUTERIZED SYSTEM FOR DISPLAY AND STORAGE OF MATERIALS BATCHING INFORMATION

[75] Inventor: Michael P. Sargent, Huntsville, Ala.

[73] Assignee: Beowulf Corporation, Huntsville, Ala.

[21] Appl. No.: 398,448

[22] Filed: Aug. 25, 1989

[51] Int. Cl.$^5$ .................. G06F 15/46; G01T 7/58; B01F 11/00
[52] U.S. Cl. .................. 364/478; 364/188; 364/502; 177/70; 366/130
[58] Field of Search .......... 364/468, 478, 479, 500, 364/469, 502, 188, 189, 567, 568; 366/130–132, 136–138, 141, 142, 152, 153, 16, 18; 414/786; 177/70, 25.11, 122.50, 123

[56] References Cited

U.S. PATENT DOCUMENTS

| | | | |
|---|---|---|---|
| 3,763,943 | 10/1973 | Bullivant | 177/123 |
| 3,959,636 | 5/1976 | Johnson et al. | 364/189 |
| 4,222,448 | 9/1980 | Sunkle et al. | 177/122 |
| 4,272,824 | 6/1981 | Lewinger et al. | 366/152 |
| 4,498,783 | 2/1985 | Rudolph | 366/132 |
| 4,581,704 | 4/1986 | Mitsukawa | 364/479 |
| 4,588,091 | 5/1986 | Wade | 364/502 |
| 4,629,392 | 12/1986 | Campbell | 414/786 |
| 4,656,600 | 4/1987 | Swann | 364/567 |
| 4,719,574 | 1/1988 | Duback et al. | 364/468 |
| 4,779,186 | 10/1988 | Handke et al. | 364/502 |
| 4,830,508 | 5/1989 | Higuchi et al. | 366/18 |
| 4,840,239 | 6/1989 | Slagg | 177/70 |
| 4,863,277 | 9/1989 | Neal et al. | 366/137 |
| 4,886,367 | 12/1989 | Bragg et al. | 366/132 |

Primary Examiner—Jerry Smith
Assistant Examiner—Jim Trammell
Attorney, Agent, or Firm—John C. Garvin, Jr.; James E. Staudt

[57] ABSTRACT

A material handling system (10) for storage, recording and display of information required to aid in the filling, mixing, loading, and recording of complex mixtures of materials such as fertilizer; wherein a computer (12), a key board (20), and a load cell (28) provide input to a central unit (16) which processes the inputs and activates a board (18) which displays information required to sequentially load several ingredients into a hopper (24) to form mixture batches which are sequentially transported by a conveyor (30) to a mixer (32) and then by a loading tube (34) to a hauling vehicle (36).

7 Claims, 2 Drawing Sheets

COMPUTERIZED SYSTEM FOR DISPLAY AND STORAGE OF MATERIALS BATCHING INFORMATION

TECHNICAL FIELD

The present invention is related generally to materials handling systems and more specifically to a computerized system for handling complex mixtures of materials such as fertilizers.

BACKGROUND OF THE INVENTION

The importance of accurate control of fertilizer mixtures has become increasingly apparent in recent years with the rapid progression of modern farming methods. By analysis of soil samples farm laboratories are now capable of providing precise requirements for fertilizer mixtures for individual farm fields. This fertilizer mixture information is commonly retained by fertilizer suppliers and is stored in computers. Typically when a customer orders fertilizer, the supplier will retrieve the customer's name and the fertilizer mixture information from the computer in the form of a paper print out. The print out will then be presented to a loading operator who is responsible for filling the order. The various fertilizer ingredients are dumped sequentially into a receptacle commonly referred to as a scale hopper, and are then weighed by a large scale having a dial indicator. The loading of the required amounts of each ingredient thus forms a batch which is carried to a mixer which operates to provide a uniformly mixed final product. After mixing, the batch is dumped into a field spreader unit. This process is repeated until the required amount of fertilizer has been processed. Review of this procedure reveals a very complex task for the operator responsible for the loading procedure. The factors he must consider include the weight capacity of the field spreader unit, the weight capacity of the scale hopper, the capacity of the mixer, the weight of each ingredient which is to be added to each batch, the total weight of each batch, and the total number of batches required. The procedure is further complicated by difficulty in accurately reading a dial indicator scale which is inherently unstable as it reacts to dumping from a bucket loader and which can be read only to plus or minus 30 pounds. As an example of a typical procedure, it is necessary for a loading operator to load, transport, dump, and weigh approximately 125 scoop loads from 5 or more fertilizer supply bins in order to prepare 5 batches which are required to make up 1 deliverable load of fertilizer. During a normal day an operator would repeat the scooping operation 1000 or more times.

It is readily apparent from the above that such an operation, without an automatic control system, is highly susceptible to error. In actual practice such errors have been in the form of excesses of a particular ingredient. In many instances these errors have damaged or ruined crops. Additionally, this system is totally dependent upon records kept by the operator as the loading progresses. These records which include the information necessary for billing, inventory control, and other record keeping requirements, are manually loaded into a computer at the end of each day.

The primary objects of the present invention are to obviate the above mentioned and other shortcomings of the systems described above.

These and other objects of the present invention will become apparent to those skilled in the art, as the description thereof proceeds.

SUMMARY OF THE INVENTION

The present invention is a computerized system for the storage, retrieval and display of information, so as to provide information to aid accurate manual loading, and to provide automatic recording of complex mixtures of materials such as fertilizers.

DETAILED DESCRIPTION OF THE INVENTION

The present invention is a computerized system for display and storage of batching information. This system is particularly suited for the storage, retrieval and display of information required for identification, accurate manual loading and automatic recording of complex mixtures of materials such as fertilizers.

Figure 1:
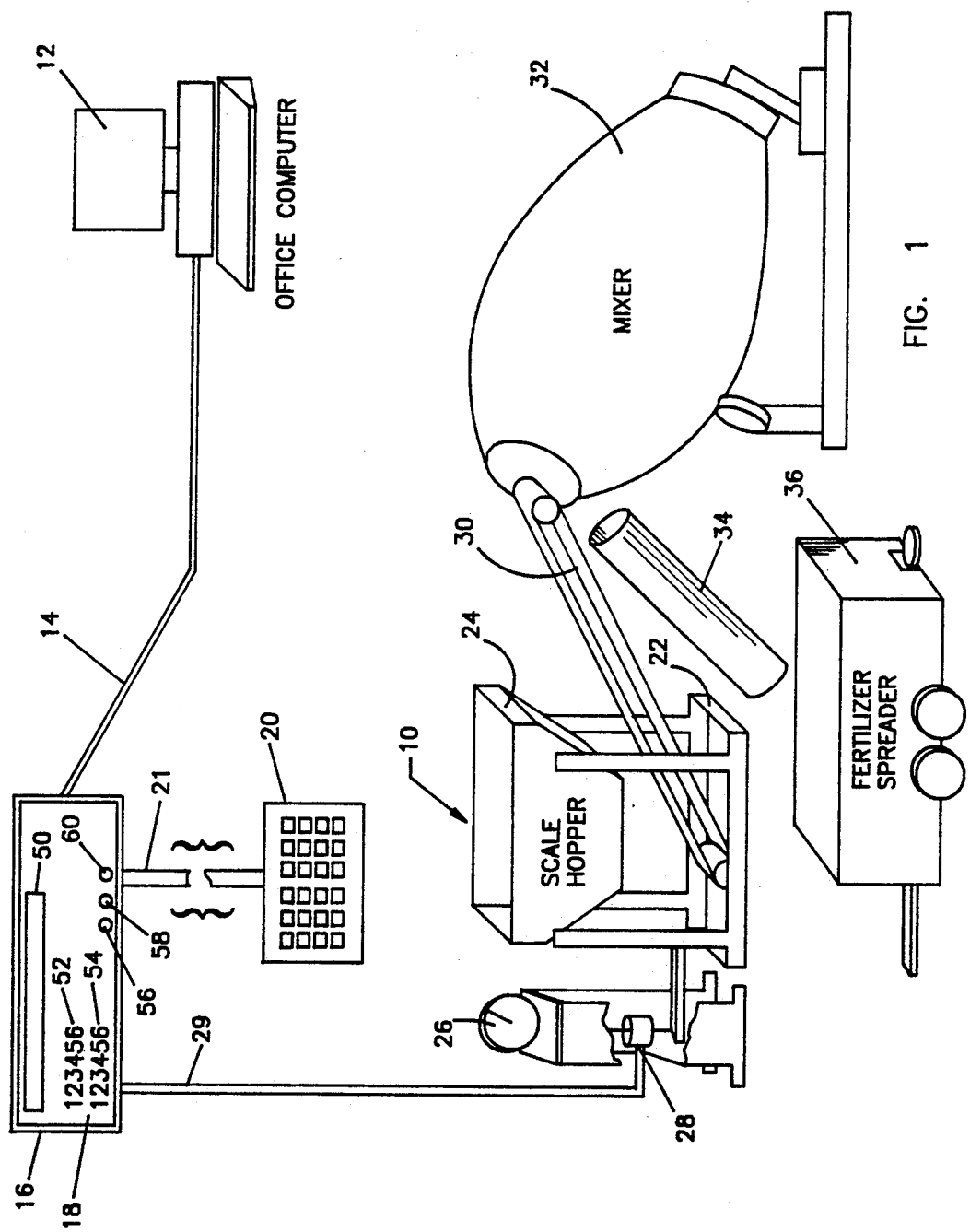
FIG. 1 is pictorial-diagrammatic illustration of the system used to perform a computerized materials mixing and loading procedure.
Figure 2:
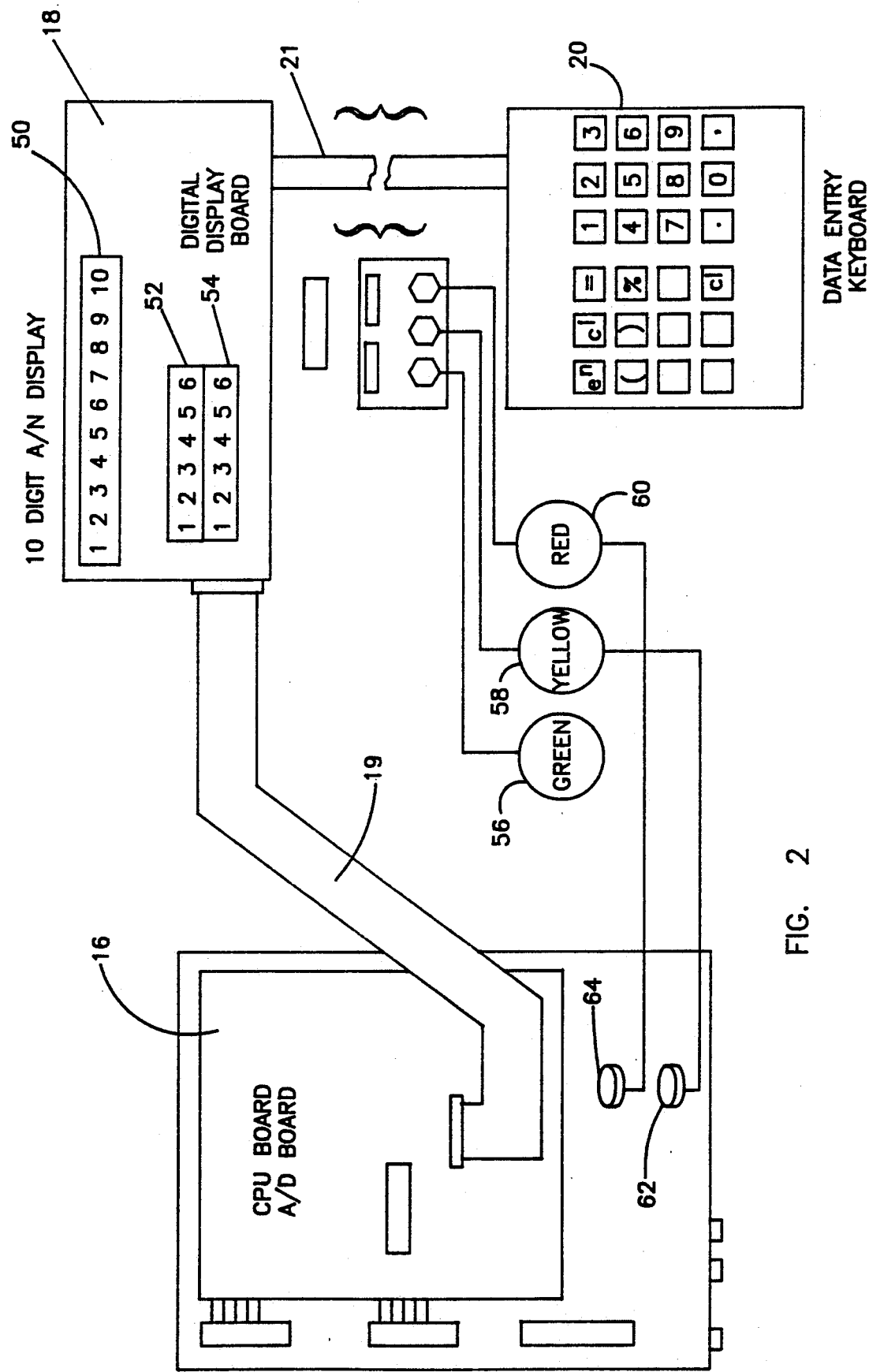
FIG. 2 is an enlarged pictorial diagrammatic illustration of major electrical and electronic components of the computerized materials mixing and loading system.

Referring now to FIG. 1 the system is shown generally by numeral 10. A computer 12 is utilized to receive, store and disseminate information relating to material mixtures which are handled by the system. For convenience the computer and its ancillary equipment which is operated by office personnel is referred to as a computer station. The computer is normally housed in an office which may be located apart from the remainder of the system. The computer is attached by a communications cable 14 through an internally mounted modem to a central processor unit 16 through which signals from all communicating components of the system are processed. While the central processor unit 16 may be physically located apart from the computer, because of its function, it is considered to be part of the computer station. The central processor unit, like the computer, is a commerically available unit which lends itself to modifications to achieve system peculiar requirements. These modifications may be easily accomplished by one skilled in the art. As an example, a suitable central processor unit is available commerically from the Intel Corp. of Santa, Calif. For convenience, a display board 18 is attached to the central processor unit. This board may be located away from the processor in any convenient location if desired. The board 18 along with all other displays and controls used by the loading operator are arranged for his convenience and are referred to in combination as a loading station. The display board 18, illustrated in greater detail in FIG. 2, is connected to the central processor by a communication cable 19. The display board 18 includes a 10 digit row 50 of alphanumeric indicators such as may be provided by Light Emitting Diodes (LED) and two rows 52 and 54 of similar indicators having 6 numerals each. Also included on the display board are three lights 56, 58 and 60 which serve as indicators of the progress of a batch loading cycle. The lights are colored green, yellow, and red respectively and are illustrated in place in FIG. 1 and schematically in FIG. 2. As with conventional light signals, green indicates a commencement or continuation of the loading process, yellow, a slowing of the loading and red is the stop loading signal. Connected in conjunction with the yellow and red signal, and illustrated in FIG. 2, are high volume audio alarms 62 and 64 which provide audio warnings in addition to the slow and stop light signals. As the yellow light is turned on a beeping audio signal is simultaneously emitted from alarm 62. As the red light is turned on a steady audio signal is simultaneously emitted from alarm 64. The audio signal devices are located within the housing which contains the central processor unit. If desired, the audio signals may be relocated to a position closer to the loading operator.

A data entry key board 20 is connected by a communications cable 21 for communication with the display board 18 and the central processor 16. The key board serves to actuate the display board 20 and communicate with the computer 12 through the central processor unit 16. A support frame 22 moveably supports a scale hopper 24 so as to selectively actuate a scale 26 or a load cell 28 as the hopper is loaded or emptied. The load cell is connected for communication with the central processing unit 16 by a communications cable 29 so as to transmit signals relating to the weight of material in the scale hopper 24. These signals are then processed for appropriate actuation of the display board 18 and the computer 12. While either a load cell or a conventional electrical pick up attached to a dial scale may be utilized, a load cell is much preferred because of its more stable output signal. Load cells of this type are comercially available from the Beowolf Corporation of Huntsville, Ala. A conventional dumping mechanism (not shown) serves to dump material from the hopper onto a conveyer 30 which transports the material to a mixer 32. The material which consists of several ingredients is then tumbled in the mixer until a uniform mixture is achieved. The mixed material is then discharged through tube 34 into a truck or trailer 36 for delivery and spreading.

In operation of the computerized system, which is the subject of this invention, a loading operator having turned the system on would receive a "READY" read out on display row 50. The operator is supplied with written information which provides the load number and the name of the customer who is to receive the load. By means of the key board 20, the operator enters the number of the load which is to be prepared. From information stored in the computer and processed through the central processor unit the display row 50 begins a scrolling operation and sequentially displays the load number entered by the operator, the number of batches which will be required to make up the load and the name of the customer who is to receive the load. As the operation progresses the operator is able to verify that he has entered the correct number. Further verification that the information being retrieved is correct is provided by comparison of the displayed customer's name to the customer's name which appears on the written information provided to the operator. If the verification process shows an error in the entry, the operator clears the keyboard and repeats the procedure. Having successfully completed the verification procedure, the operator presses the enter key on the keyboard to activate the sequential operation which will be followed for the total loading process. The displays react to the enter signal in the following manner. Display row 50 will provide identification of the first ingredient to be placed in the scale hopper. This identification display will remain only a sufficient time for the operator to identify the ingredient. Approximately 10 seconds is typical. In the case of fertilizer this identification would be a number recognized in the industry as including certain elements or chemicals. A typical identification number, for example, is 18-46-0. These numbers indicate the percentages of Nitrogen, Phosphate and Potash respectively. After the allotted viewing time passes the identification number of the ingredient is replaced for a predetermined time by a number indicating the weight of the ingredient which will be required in the first batch which is to be mixed. As the weight is displayed on display row 50 three additional displays are simultaneously actuated. These are display row 52 which indicates the number of the batch being created (initially reads 1), display row 54 which indicates the sequential number of the ingredient being added to make up the batch (initially reads 1) and the green indicator light 56 which will be turned on. The weight will be displayed only for a sufficient time for the operator to be made aware of the total weight required. The scrolling then continues and the material identification number is again displayed on row 50. To keep the operator aware of the ingredient he is to be loading, the material identification number remains displayed so long as the green light is illuminated. The operator proceeds with the loading vehicle to a bin which contains the first ingredient to be placed in the scale hopper 24, loads the vehicle, returns to the loading station, and begins the dumping procedure by pouring the first ingredient into the scale hopper. As the ingredient is poured into to scale hopper and the weight of ingredient 1 reaches 90% of the original displayed weight the green indicator light 56 turns off, the yellow light 58 turns on, the pulsing audio beeper 62 is activated and the display 50 will change from showing the material identification to the weight of the ingredient which is yet to be added. The weight reading declines toward zero as the ingredient is added. These signals and the weight readings warn the operator that the pouring of ingredient 1 is nearing completion and he must slow the pouring. As the operator reaches the weight requirement for ingredient 1 the yellow light 58 turns off, the red light 60 turns on for a predetermined time, typically about 10 seconds, the pulsing beeper 62 stops, the steady beeper 64 sounds for 3 to 5 seconds, the weight reading on display row 50 reads -0-, and the display row 50 after reading the final zero weight for a brief period of time scrolls to read END 18-46-0. At this point all displays and lights begin the sequence again with identification and weight of the second ingredient being sequentially displayed on display row 50, the batch display row 52 remaining on 1 (until the batch is completed) and the ingredient display row 54 displaying 2 to indicate that the second ingredient of the batch is now to be added. This loading process is repeated until the batch is completed and conveyed to the mixer at which time the display row 50 will read "END LOAD". During the loading procedure all necessary data such as cumulative weight of ingredients, batches and the total load is automatically stored for retrieval by the computer. This information provides the basis for checking all phases of the accuracy of the load as well as the running totals of each ingredient which in turn provides the basis for billing, inventory control, and information required by government agencies such as for taxes and environmental requirements.

I claim:

1. A computerized system for directing the manual loading, batching and mixing of a plurality of materials, said system comprising:

a computer station having means for reception, storage, processing and dissemination of information relating to predetermined requirements for the loading and batching of said materials and for receiving signals relating to actual loading and batching data;

a loading station remotely located from and connected to said computer station, said loading station having means for manual access and automated sequential reception and display of selected information from said computer station, for transmitting said actual loading and batching data to said computer station and for display of said actual loading and batching data in the area of said loading station, and wherein said computer station and said loading station are operated independently of said manual loading.

2. An apparatus as set forth in claim 1 wherein said loading station includes a material measuring mechanism which generates a portion of said actual loading and batching data in the form of weight of one or more of said plurality of materials.

3. An apparatus as set forth in claim 2 wherein said loading station includes a materials receptacle connected to said materials measuring mechanism for actuating said material measuring mechanism in response to the quantity of materials in said receptacle.

4. An apparatus as set forth in claim 3 wherein in response to signals from said computer station the loading station sequentially displays the name of the intended recipient of the material, the formula of the material to be loaded, the amount to be loaded, and the size, number and formula of the batches required to constitute a mixable quantity of the material.

5. An apparatus as set forth in claim 4 wherein said loading station includes a series of lights and audio signals which operate sequentially to provide a warning that a loading operation is approaching completion so as to aid in the accurate combination of required materials.

6. An apparatus as set forth in claim 5 wherein said lights and said audio signals are actuated in conjunction whereby a green light indicates continuation of a loading operation, a pulsating audio signal will occur and a yellow light will appear as the end of a loading operation approaches, and steady audio signal will occur and a red light will appear at the point at which the loading process is to be stopped.

7. An apparatus as set forth in claim 1 wherein said loading station provides signals for storage by said computer station which signals indicate the actual amounts of each specific material in each batch and the number of batches which were included in a predetermined loading sequence.

* * * * *